(12) United States Patent  
Alter

(10) Patent No.: US 8,695,302 B2
(45) Date of Patent: Apr. 15, 2014

(54) AIR SEAL ASSEMBLY

(75) Inventor: Harry Alter, Granville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 13/427,151

(22) Filed: Mar. 22, 2012

(65) Prior Publication Data

US 2013/0247491 A1     Sep. 26, 2013

(51) Int. Cl.
*E04C 2/34* (2006.01)

(52) U.S. Cl.
USPC .......................... 52/481.1; 52/468; 52/127.2

(58) Field of Classification Search
USPC .......... 52/127.1, 127.2, 460, 461, 468, 481.1, 52/483.3
See application file for complete search history.

(56) References Cited

U.S. PATENT DOCUMENTS

| | | | | |
|---|---|---|---|---|
| 2,293,744 A * | 8/1942 | Miles et al. | ...................... | 52/547 |
| 3,235,039 A * | 2/1966 | O'Donnell | ...................... | 52/235 |
| 3,553,915 A * | 1/1971 | Passovoy | ...................... | 52/241 |
| 4,045,932 A * | 9/1977 | Bogert | ............................ | 52/460 |
| 4,479,339 A * | 10/1984 | Kroh | .............................. | 52/468 |
| 5,170,603 A * | 12/1992 | Bartlett | ...................... | 52/282.3 |
| 5,660,010 A * | 8/1997 | Sayers | ............................ | 52/217 |
| 6,119,429 A | 9/2000 | Bifano et al. | | |
| 6,651,402 B2 | 11/2003 | Grunst | | |
| 6,823,641 B2 | 11/2004 | Grunst | | |
| 7,481,030 B2 | 1/2009 | Grunst | | |
| 8,051,623 B2 * | 11/2011 | Loyd | ............................ | 52/747.1 |
| 8,136,314 B2 * | 3/2012 | Klein | .............................. | 52/232 |
| 8,151,533 B2 * | 4/2012 | Krieger | ...................... | 52/489.1 |
| 2005/0102964 A1 | 5/2005 | Grunst | | |
| 2010/0251642 A1 * | 10/2010 | Erickson | ...................... | 52/204.1 |

FOREIGN PATENT DOCUMENTS

| | | | | |
|---|---|---|---|---|
| DE | 10248413 A1 | 4/2004 | | |
| EP | 1548222 A1 * | 6/2005 | ............... | E06B 1/62 |
| GB | 2399575 A | 9/2004 | | |

* cited by examiner

*Primary Examiner* — Brian Glessner
*Assistant Examiner* — Adam Barlow
(74) *Attorney, Agent, or Firm* — Calfee, Halter & Griswold, LLP

(57) ABSTRACT

An air seal assembly is provided. The air seal assembly includes a plurality of segments configured to form a cavity. The cavity is configured to engage an edge of a construction material. A gasket material is applied to an exterior surface of one of the segments. In an installed position, the air seal assembly is configured to substantially seal gaps formed between the construction material and other materials forming a wall.

18 Claims, 4 Drawing Sheets

AIR SEAL ASSEMBLY

BACKGROUND

The energy efficiency of commercial and residential buildings, such as for example offices, homes and apartments, can be affected by various factors including the passage of air into and out of the building and the passage of air from unheated or un-cooled areas of the building into heated or cooled areas of the building and visa versa. Examples of unheated or un-cooled areas of the building areas can include attics and craw spaces.

In some instances, buildings can incorporate structures within the building in an attempt to control the passage of air into and out of the building. One example of an incorporated structure is a vapor barrier. Generally, the vapor barrier is configured to "seal" portions of the building, thereby controlling the passage of air into and out of the building.

In other instances, buildings can incorporate insulative methods in an attempt to control the passage of air into and out of heated and unheated areas within the building. On example of an incorporated insulative structure is loosefill insulation positioned between an unheated attic and a heated living space.

It would be advantageous if systems could be developed to better control the passage of air from unheated areas of the building into heated areas of the building and visa versa.

SUMMARY OF THE INVENTION

The above objects as well as other objects not specifically enumerated are achieved by an air seal assembly. The air seal assembly includes a plurality of segments configured to form a cavity. The cavity is configured to engage an edge of a construction material. A gasket material is applied to an exterior surface of one of the segments. In an installed position, the air seal assembly is configured to substantially seal gaps formed between the construction material and other materials forming a wall.

According to this invention there is also provided a building construction including a plurality of framing members, a construction material attached to the plurality of framing members and at least one air seal assembly attached to the construction material. The air seal assembly is configured to substantially seal gaps formed between the construction material and the plurality of framing members forming the building construction.

According to this invention there is also provided a method of substantially sealing gaps formed between construction material and a plurality of framing members forming a building construction. The method includes the steps of forming a building construction having a plurality of framing members, positioning an air seal assembly such as to engage at least one edge of the construction material and attaching the construction material to the building construction such that the air seal assembly substantially seals gaps formed between the construction material and the plurality of framing members.

Various objects and advantages of the air seal assembly will become apparent to those skilled in the art from the following detailed description of the preferred embodiment, when read in light of the accompanying drawings.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The description and figures disclose an air seal assembly for application between framing structures and other construction materials of a residence or building. Generally, the air seal assembly is configured to substantially prevent the movement of air through gaps formed between framing structures and other construction materials, such as in an exterior building sidewall, from unheated areas of the building into heated areas of the building and visa versa.

Figure 1:
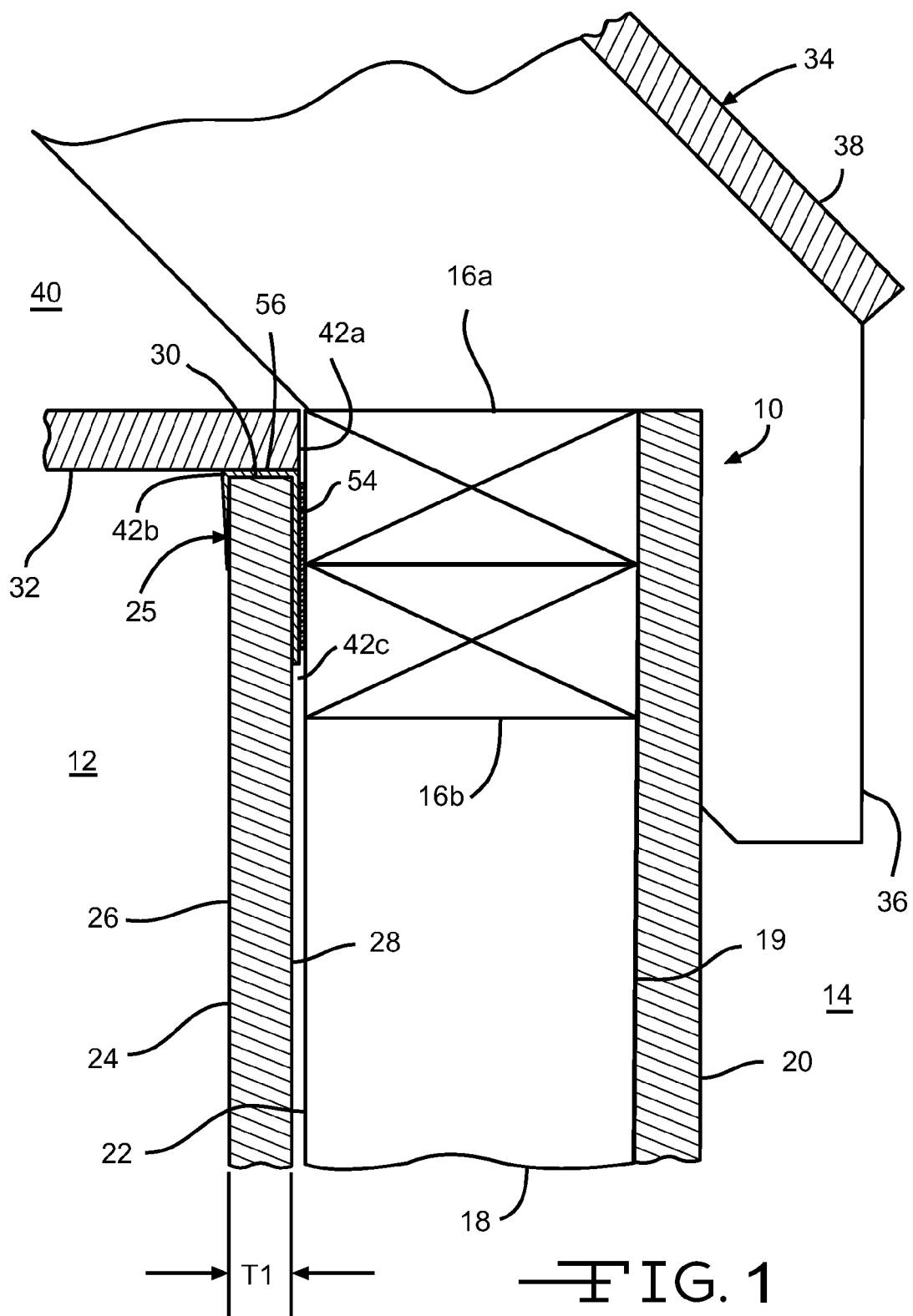
FIG. 1 is a side view, in elevation, of an external sidewall of a building illustrating an installed air seal assembly.

Referring now to FIG. 1, one example of an exterior building sidewall (hereafter "sidewall") is shown generally at 10. The sidewall 10 is configured to separate interior areas 12 of the building from exterior areas 14, as well as providing a structural, protective and aesthetically pleasing covering to the sides of the building. The sidewall 10 can be formed from various structural framing members, such as the non-limiting examples of top plates 16a and 16b and studs 18 extending from the top plates 16a and 16b to bottom plates (not shown). The top plates 16a and 16b, studs 18 and bottom plates can be configured to provide surfaces to which additional framing members, wall panels and/or construction materials can be attached. In certain embodiment, the top plates 16a and 16b, studs 18 and bottom plates are made of wood. In other embodiments, the top plates 16a and 16b, studs 18 and bottom plates can be made of other desired materials, including the non-limiting example of steel. The top plates 16a and 16b, studs 18 and bottom plates can have any desired dimensions.

Referring again to FIG. 1, the sidewall 10 has an exterior surface 19 covered by an exterior sheathing 20 that is attached to the various structural framing members. The exterior sheathing 20 is configured to provide rigidity to the sidewall 10 and also configured to provide a surface for exterior wall coverings (not shown). In the illustrated embodiment, the exterior sheathing 20 is made of oriented strand board (OSB). In other embodiments, the exterior sheathing 20 can be made of other materials, such as for example plywood, waferboard, rigid foam or fiberboard, sufficient to provide rigidity to the sidewall 10 and to provide a surface for exterior wall coverings.

The sidewall 10 has an interior surface 22. The interior surface 22 of the sidewall 10 can be covered by construction material 24. The construction material 24 can be any desired material or combination of materials, including the non-limiting examples of drywall and gypsum. The construction material 24 has an interior surface 26, an exterior surface 28, a top edge 30, a bottom edge (not shown) and a thickness T1. In the illustrated embodiment, the thickness T1 is in a range of from about 0.25 inches to about 0.75 inches. However, in other embodiments, the thickness T1 can be less than about 0.25 inches or more than about 0.75 inches.

Referring again to FIG. 1, the top edge 30 of the construction material 24 is bounded by an air seal assembly 25. The air seal assembly 25 is configured for several functions including providing a finished appearance to the top edge 30 of the construction material 24. The air seal assembly 25 will be discussed in more detail below.

Referring again to FIG. 1, a ceiling 32 is formed within the interior areas 12 of the building, adjacent the upper portions of the sidewall 10. The ceiling 32 can include a ceiling covering (not shown) attached to ceiling joists (not shown). The ceiling covering can be made from any desired materials, including the non-limiting examples of ceiling tile, drywall or gypsum.

A roof structure 34 is connected to the upper portions of the sidewall 10. In the illustrated embodiment, the roof structure 34 includes a plurality of roof rafters 36 attached to the sidewall 10. The roof rafters 36 are configured to support other structures, such as for example, a roof deck 38 and shingles (not shown). In other embodiments, the roof structure 34 can include or be formed from other desired structures.

Referring again to FIG. 1, an attic 40 can be formed in the space above the ceiling 32 and below the roof structure 34. Optionally, one of more layers of insulation (not shown) can be installed in the attic 40 and positioned over the ceiling 32 to insulate the interior areas 12 of the building. The layers of insulation can be any desired type of insulation, such as for example batts or blankets of fiberous insulation or loosefill insulation, sufficient to insulate the interior areas 12 of the building.

In certain instances, gaps can form between the various structural framing members and the other construction materials forming the sidewall 10. The term "gaps", as used herein, is defined to mean spaces or openings through which a flow of air can pass. In the illustrated embodiment, a first gap 42a is formed between the top plate 16a and an edge of the ceiling 32, a second gap 42b is formed between a top edge of the construction material 24 and the ceiling 32 and a third gap 42c is formed between the exterior surface 28 of the construction material 24 and the top plates 16a and 16b. In certain conditions, such as for example, where there is a temperature differential between the attic 40 and the interior areas 12 of the building, the gaps 42a-c, can allow an undesirable flow of air to pass between the attic 40 and the interior areas 12 of the building. Referring again to FIG. 1, the air seal assembly 25 is positioned between the top plates 16a and 16b, the ceiling 32 and the construction material 24 such as to substantially prevent the movement of air through the gaps 42b and 42c. While the embodiment illustrated in FIG. 1 shows a quantity of two top plates 16a and 16b, it should be appreciated that in other embodiments the air seal assembly 25 can be positioned between a sidewall having any number of top plates and the construction material 24.

Figure 2:
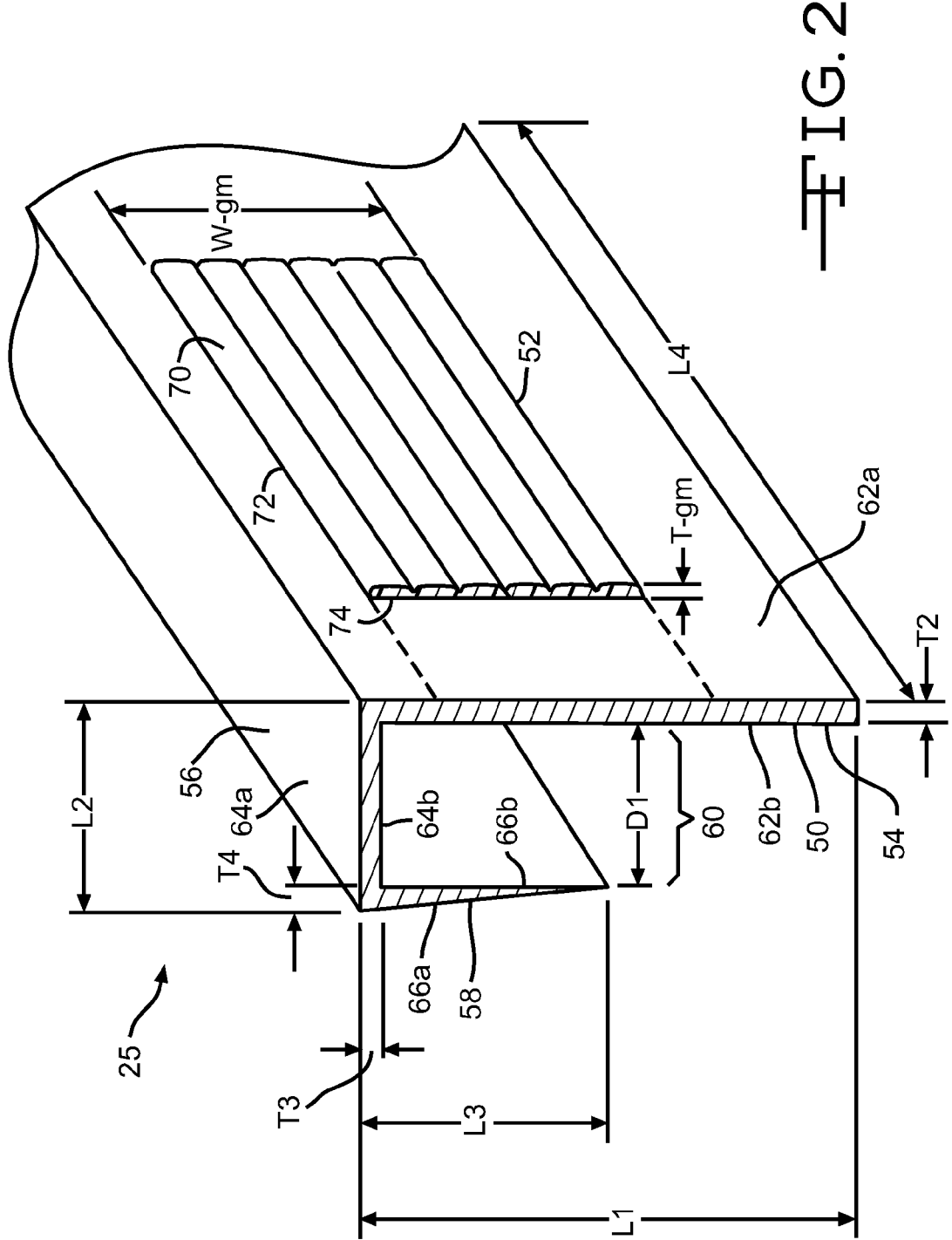
FIG. 2 is a perspective view of the air seal assembly of FIG. 1.

Referring now to FIG. 2, the air seal assembly 25 includes a channel 50 attached to gasket material 52. The channel 50 includes a first segment 54, a second segment 56 and a third segment 58. The first segment 54, second segment 56 and third segment 58 cooperate to form a recess 60. The recess 60 has a depth D1 that generally corresponds to the thickness T1 of the construction material 24. Accordingly, in the illustrated embodiment, the depth D1 is in a range of from about 0.25 inches to about 0.75 inches. However, in other embodiments, the depth D1 can be less than about 0.25 inches or more than about 0.75 inches such as to generally correspond to the thickness T1 of the construction material 24.

The first segment 54 of the channel 50 has a first surface 62a and a second surface 62b. The first surface 62a is configured to receive the gasket material 52. In the illustrated embodiment, the first surface 62a is a substantially flat surface. However, in other embodiments, the first surface 62a can include textures or coatings configured to facilitate adhesion to the gasket material 52. Non-limiting examples of a textured surface include scored lines and cross-hatching.

The second surface 62b of the first segment 54 is configured to seat against the exterior surface 28 of the construction material 24. In the illustrated embodiment, the second surface 62b is a substantially flat surface. However, in other embodiments, the second surface 62b can include textures or coatings configured to facilitate seating of the second surface 62b against the exterior surface 28 of the construction material 24.

The first segment 54 has a thickness T2 and a length L1. In the illustrated embodiment, the thickness T2 is in a range of from about 0.05 inches to about 0.20 inches and the length L1 is in a range of from about 1.0 inches to about 6.0 inches. Alternatively, in other embodiments, the thickness T2 can be less than about 0.05 inches or more than about 0.20 inches and the length L1 can be less than about 1.0 inches or more than about 6.0 inches.

The second segment 56 of the channel 50 has a first surface 64a and a second surface 64b. The first surface 64a is configured to seat against the ceiling 32. In the illustrated embodiment, the first surface 64a is a substantially flat surface. However, in other embodiments, the first surface 64a can include textures or coatings configured to facilitate seating against the ceiling 32.

The second surface 64b of the second segment 56 is configured to seat against the top edge 30 of the construction material 24. In the illustrated embodiment, the second surface 64b is a substantially flat surface. However, in other embodiments, the second surface 64b can include textures or coatings configured to facilitate seating of the second surface 64b against the top edge 30 of the construction material 24.

The second segment 56 has a thickness T3 and a length L2. In the illustrated embodiment, the thickness T3 is in a range of from about 0.05 inches to about 0.20 inches and the length L2 is in a range of from about 0.30 inches to about 0.80 inches. In other embodiments, the thickness T3 can be less than about 0.05 inches or more than about 0.20 inches and the length L2 can be less than about 0.30 inches or more than about 0.80 inches.

The third segment 58 of the channel 50 has a first surface 66a and a second surface 66b. The first surface 66a is configured to provide a finished appearance to the top edge 30 of the construction material 24 with subsequently applied finishing material such as spackling or plaster (not shown). In the illustrated embodiment, the first surface 66a is a substantially flat surface. However, in other embodiments, the first surface 66a can include textures or coatings configured to facilitate a desired appearance of subsequently applied finishing material.

The second surface 66b of the third segment 58 is configured to seat against the interior surface 26 of the construction material 24. In the illustrated embodiment, the second surface 66b is a substantially flat surface. However, in other embodiments, the second surface 66b can include textures or coatings configured to facilitate seating of the second surface 66b against the interior surface 26 of the construction material 24.

The third segment 58 has a length L3. In the illustrated embodiment, the length L3 is in a range of from about 0.30 inches to about 0.80 inches. Alternatively, the length L3 can be less than about 0.30 inches or more than about 0.80 inches.

Referring again to FIG. 2, the third segment 58 has the cross-sectional shape of a taper from an initial thickness T4 at an intersection with the second segment 56. In the illustrated embodiment, the thickness T4 is in a range of from about 0.05 inches to about 0.20 inches. However, in other embodiments, the thickness T4 can be less than about 0.05 inches or more than about 0.20 inches.

While the embodiment shown in FIG. 2 illustrates the third segment 58 to have a cross-sectional shape of a taper, it should be appreciated that in other embodiments, the third segment 58 can have other desired cross-sectional shapes including a rectangular cross-sectional shape.

The channel 50 has a length L4. In the illustrated embodiment, the length L4 is in a range of from about 24.0 inches to about 144.0 inches. However, in other embodiments, the length L4 can be less than about 24.0 inches or more than about 144.0 inches.

In the illustrated embodiment, the channel 50 is formed from a cold rolled steel material. However, it should be appreciated that the channel can be formed from other desired materials, such as for example, aluminum and polymeric materials.

While the embodiment of the channel 50 illustrated in FIG. 2 is shown as an integral one-piece structure, it is within the contemplation of this invention that the channel can be formed from separate and distinct segments that are joined together.

Referring again to FIG. 2, the recess 60 is configured such as to substantially enclose the top edge 30 of the construction material 24. The installation of the air seal assembly 25 will be discussed in more detail below.

As discussed above, the gasket material 52 is attached to the first surface 62a of the first segment 54 and extends substantially the length L4 of the channel 50. While the embodiment shown in FIG. 2 illustrates the gasket material 52 as being substantially vertically centered on the first surface 62a of the first segment 54, in other embodiments the gasket material 52 can be positioned in other locations on the first surface 62a of the first segment 54.

Referring again to FIG. 1, the second segment 56 of the air seal assembly 25 is configured to substantially seal the gap 42b between the top edge 30 of the construction material 24 and the ceiling 32. The combination of the first segment 54 and the gasket material 52 are configured to substantially seal the gap 42c between the exterior surface 28 of the construction material 24 and the top plates generally corresponds to the thickness T1 of the construction material 24 16a and 16b. The term "seal", as used herein, is defined to mean substantially providing both an insulative value and a water barrier. In the illustrated embodiment, the gasket material 52 is made of a polyethylene foam material. One example of a gasket material 52 is FoamSealR™ manufactured by Owens Corning Corporation headquartered in Toledo, Ohio. In other embodiments, the gasket material 52 can be made of other materials, such as for example felt or tar paper, sufficient to substantially seal the third gap 42c in combination with the first segment 54 of the air seal assembly 25. In still other embodiments, the gasket material 52 can have other forms, including the non-limiting examples of foams formed from spray-on applications and elastomeric sealants.

Referring again to FIG. 2, the gasket material 52 has a width W-gm. In the illustrated embodiment, the width W-gm of the gasket material 52 is in a range of from about 1.0 inch to about 6.0 inches. In other embodiments, the width W-gm of the gasket material 52 can be less than about 1.0 inches or more than about 6.0 inches.

As shown in FIG. 2, the gasket material 52 has a nominal thickness T-gm prior to installation. In the illustrated embodiment, the nominal thickness T-gm of the gasket material 52 is 0.168 inches. In other embodiments, the nominal thickness T-gm of the gasket material 52 can be provided in a nominal thickness T-gm of more or less than 0.168 inches.

Referring again to FIG. 2, the gasket material 52 has a first side 70 and a second side 72. The first side 70 is configured to contact the top plates 16a and 16b, and the second side 72 is configured for attachment to the first surface 62a of the first segment 54. The second side 72 of the gasket material 52 has an adhesive 74 configured to adhere the gasket material 52 to the first surface 62a of the first segment 54. In the illustrated embodiment, the adhesive is in the form of a peel and stick adhesive. However, in other embodiments, the gasket material 52 can be attached to the first surface 62a of the first segment 54 by other adhesives or by other methods including the non-limiting example of ultrasonic welding.

Figure 3:
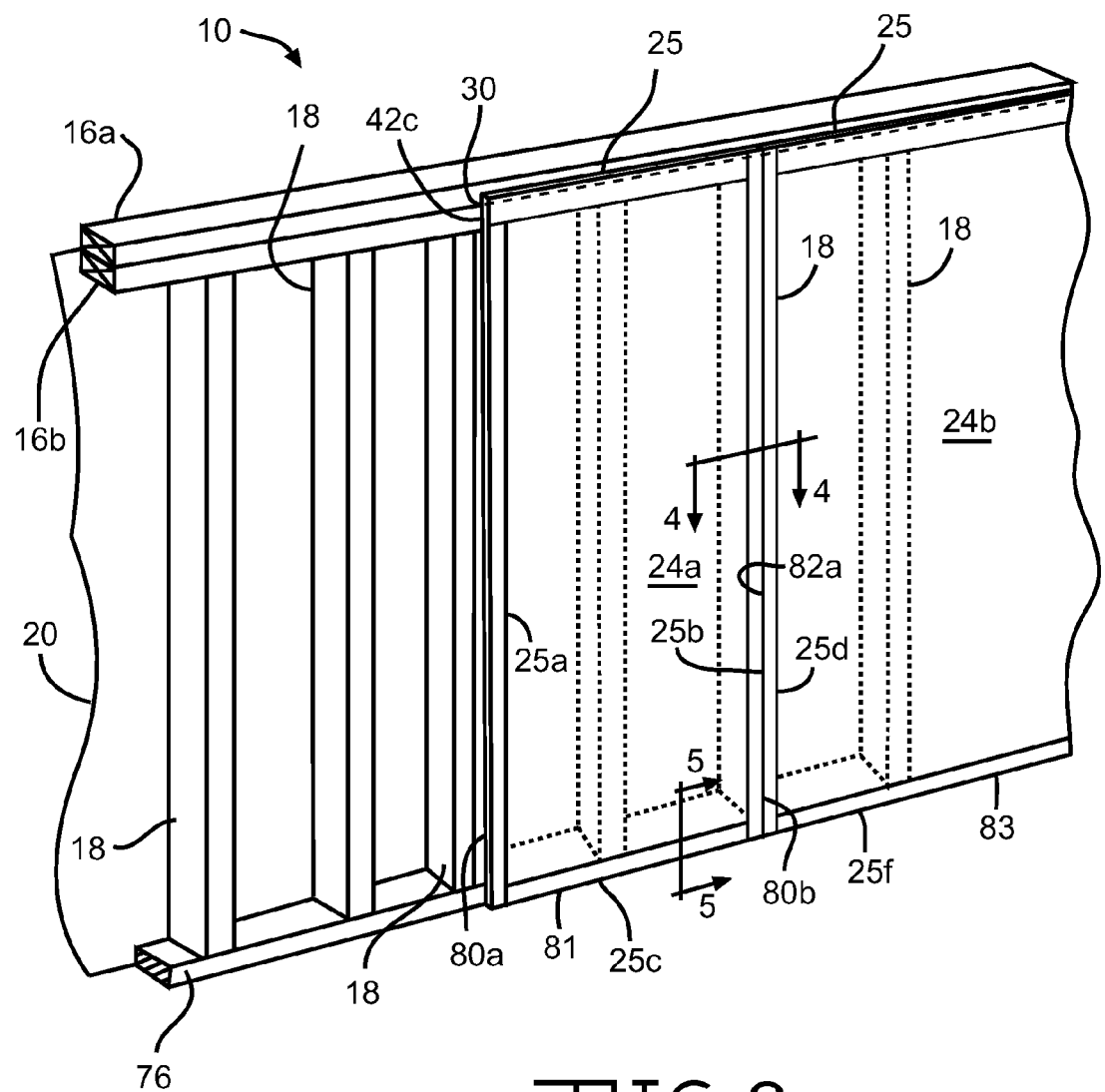
FIG. 3 is a perspective view of the air seal assembly of FIG. 2 shown installed on various edges of construction material forming a portion of an external building sidewall.

Referring now to FIGS. 1 and 3, installation of the air seal assembly 25 will now be described. Referring first to FIG. 3, the sidewall 10 is illustrated. The sidewall 10 includes the bottom plate 76, the top plates 16a and 16b, and the plurality of studs 18 extending therebetween and the exterior sheathing 20. The air seal assemblies 25, including the pre-applied gasket material (not shown), is positioned over the top edges 30 of construction materials 24a and 24b. The construction materials 24a and 24b are fastened to the top plates 16a and 16b, studs 18 and to the bottom plate 76 such that the gasket material 52 contacts, and is compressed against, the top plates 16a and 16b as also shown in FIG. 1. In this position, the air seal assemblies 25 are configured to substantially seal the gaps 42c between the exterior surface 28 of the construction materials 24a and 24b and the top plates, 16a and 16b as shown in FIG. 3. Also in this position, the air seal assemblies 25 are configured to substantially seal the second gaps 42b between the formed between the top edges 30 of the construction materials 24a and 24b and the ceiling (not shown in FIG. 3 for purposes of clarity), thereby substantially preventing the movement of air from unheated areas of the building into heated areas of the building and visa versa. While the embodiment illustrated in FIGS. 1 and 2 show the gasket material 52 attached to the first surface 62a of the first segment 54 of the channel 50, it should be appreciated that in other embodiments, optionally another gasket material (not shown) can be attached to the first surface 64a of the second segment 56 of the channel 50 and configured to substantially seal the second gap 42b between the top edge 30 of the construction material 24 and the ceiling 32 as shown in FIG. 1. As will be explained in more detail below, in this embodiment the gasket materials attached to the first and second segments, 54 and 56, are configured to simultaneously seal the gaps 42b and 42c as well as reduce the transmission of noise through the gaps 42b and 42c.

The air seal assembly 25 advantageously provides significant benefits, although all of the benefits may not be realized in all situations. First, the process of installing the air seal assemblies 25 over the top edges 30 of the construction materials 24a and 24b is an all-in-the-same-action procedure that substantially reduces the potential of damaging the gasket material 52 or damaging traditional top plate gaskets that were previously applied to the top plates 16a and 16b. Second, since the gasket material 52 is pre-applied to the channel 50, installation of the air seal assembly 25 becomes very easy and more difficult to install incorrectly. Third, having the gasket material 52 pre-applied to the channel 50 results in no additional installation time of the air seal assembly 25 over traditional drywall "J" beads.

As discussed above, the air seal assembly 25 includes the channel 50 and the gasket material 52. While the air seal assembly 25 has been described above as having the gasket material 52 applied to the channel 50 prior to installation of the air seal assemblies 25 to the top edges 30 of the construction materials 24a and 24b, it should be appreciated that in other embodiments, the channel 50 can be applied to the top edges 30 of the construction materials 24a and 24b subsequently followed by application of the gasket material 52 to the installed channel 50.

While the air seal assembly 25 has been described above as configured to substantially seal gaps between various building components and thereby substantially prevent the movement of air from unheated areas of the building into heated areas of the building and visa versa, it is within the contemplation of this invention that the air seal assembly 25 can be applied to other edges of the construction materials to substantially reduce the transmission of noise from areas of the building to other areas of the building.

Figure 4:
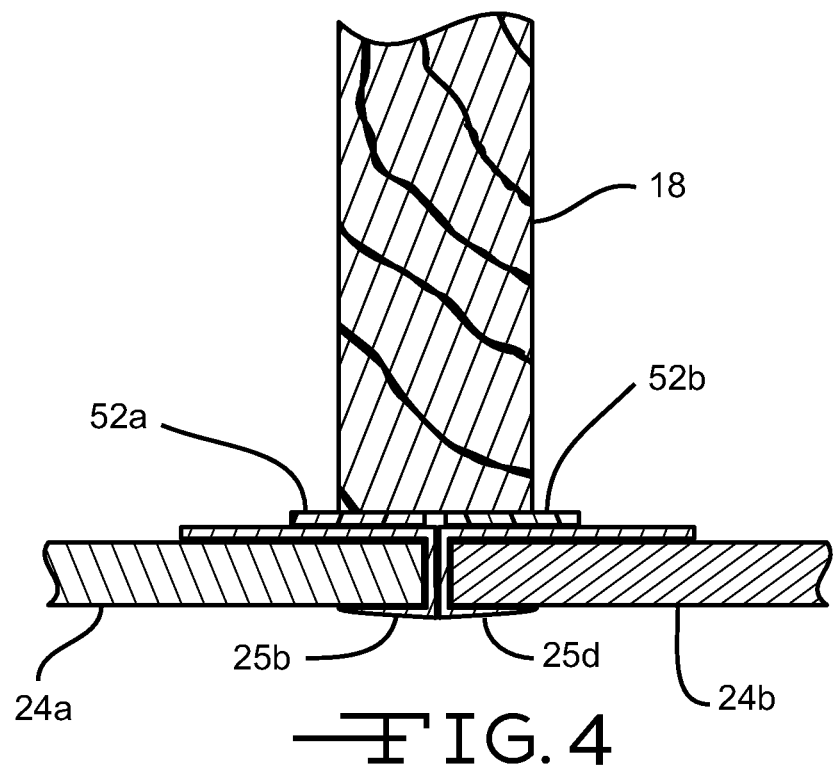
FIG. 4 is a plan view along the lines 4-4 of FIG. 3 illustrating use of the air seal assembly of FIG. 2 for controlling the transmission of noise.

Referring now to FIG. 3, construction material 24a includes first longitudinal edge 80a, a second longitudinal edge 80b and bottom edge 81. Similarly, construction material 24b includes first longitudinal edges 82a, second longitudinal edge (not shown) and bottom edge 83. Referring now to FIGS. 3 and 4, a first air seal assembly 25a has been applied to the first longitudinal edge 80a of the construction material 24a, a second air seal assembly 25b has been applied to the second longitudinal edge 80b and a third air seal assembly 25c has been applied to the bottom edge 81. Similarly, a fourth air seal assembly 25d has been applied to the first longitudinal edge 82a of the construction material 24b, a fifth air seal assembly (not shown) has been applied to the second longitudinal edge (not shown) and a sixth air seal assembly 25f has been applied to the bottom edge 83. The adjoining construction materials 24a and 24b are positioned on the sidewall 10 such that longitudinal edges 80b and 82a are proximate to each other.

Referring now to FIG. 4, the applied air seal assemblies, 25b and 25d, are shown in an installed position on adjoining construction materials 24a and 24b. In this position, the gasket materials 52a and 52b are compressed against the stud 14, such as to seal gaps formed between the construction materials 24a and 24b, thereby substantially reducing the transmission of noises through the gaps.

Figure 5:
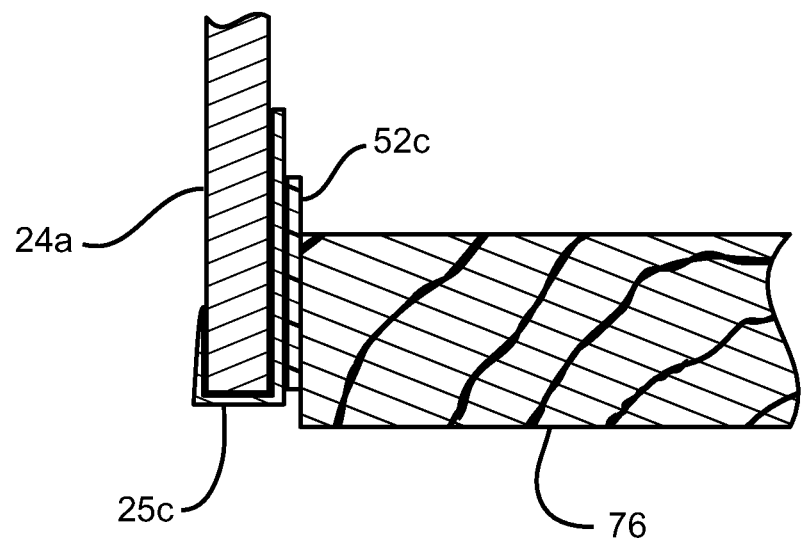
FIG. 5 is a side view, in elevation, along the lines 5-5 of FIG. 3 illustrating use of the air seal assembly of FIG. 2 for controlling the transmission of noise.

Referring now to FIG. 5, the applied air seal assembly 25c is shown in an installed position on construction materials 24a. In this position, the gasket materials 52c is compressed against the stud bottom plate 76, such as to seal the gap formed between the construction materials 24a and the bottom plate 76, thereby substantially reducing the transmission of noises through the gap.

In the manner described above, gaps formed between the framing members such as the top and bottom plates and the studs can be sealed by application of the air seal assembly 25 to the various edges of the construction materials, thereby substantially reducing the transmission of noises through the gaps.

In accordance with the provisions of the patent statutes, the principle and mode of operation of the air seal assembly have been explained and illustrated in its preferred embodiment. However, it must be understood that the air seal assembly may be practiced otherwise than as specifically explained and illustrated without departing from its spirit or scope.

What is claimed is:

1. An air seal assembly comprising:
a first segment, a second segment extending between the first segment and a third segment, the first segment and the third segment extending from the second segment, thereby forming an elongate channel, the channel configured to engage an edge of a drywall sheet, wherein the third segment has a cross-sectional thickness that tapers from the second segment to an end of the third segment; and
a gasket material applied to an exterior surface of the first segment;
wherein in an installed position, the air seal assembly is configured to substantially seal gaps formed between the drywall sheet and framing members forming a wall.

2. The air seal assembly of claim 1, wherein the segments have a thickness in a range of from about 0.05 inches to about 0.20 inches.

3. The air seal assembly of claim 1, wherein the segments are formed from a steel material.

4. The air seal assembly of claim 1, wherein the gasket material is configured for application to the first segment with peel and stick adhesive.

5. The air seal assembly of claim 1, wherein the gasket material is configured for application to the first segment prior to installation of the air seal assembly to an edge of the drywall sheet.

6. The air seal assembly of claim 1, wherein the gasket material is a foam adapted to compress between the construction material and the other materials forming a structural wall.

7. The air seal assembly of claim 1, wherein the first segment has a first length, the second segment has a second length, and wherein the ratio of the first length to the third length is from 1.25:1 to 18:1.

8. A building construction comprising:
a plurality of framing members, comprising: a top plate, studs, and a bottom plate;
a drywall sheet attached to the plurality of framing members; and
at least one air seal assembly positioned on the drywall sheet, the air seal assembly comprising:
a first segment, a second segment extending between the first segment and a third segment, the first segment and the third segment extending from the second segment, thereby forming an elongate channel, the channel configured to engage an edge of the drywall sheet, wherein the third segment has a cross-sectional thickness that tapers from the second segment to an end of the third segment; and a gasket material applied to an exterior surface of one of the segments;

wherein in an installed position, the gasket material of the air seal assembly is configured to engage at least one of: the top plate, the studs and the bottom plate;

and thereby substantially seal gaps formed between the drywall sheet and at least one of the framing members forming the building construction.

9. The building construction of claim 8, wherein the segments of the at least one air seal assembly have a thickness in a range of from about 0.05 inches to about 0.20 inches.

10. The building construction of claim 9, wherein the third segment has a tapered cross-sectional shape.

11. The building construction of claim 9, wherein the segments are formed from a steel material.

12. The building construction of claim 11, wherein the gasket material is configured for application to the first segment with peel and stick adhesive.

13. The building construction of claim 8, comprising a plurality of air-seal assemblies, wherein the assemblies are arranged to engage the top plate, the bottom plate and the studs.

14. The building construction of claim 8, wherein the gasket material is applied to the first segment during manufacture of the air seal assembly.

15. A method of substantially sealing gaps formed between a drywall sheet and a plurality of framing members forming a building construction, the method comprising the steps of:

forming a building construction having a plurality of framing members comprising: a top plate, studs and a bottom plate;

positioning an air seal assembly such as to engage at least one edge of a drywall sheet, the air seal assembly comprising:

a first segment, a second segment extending between the first segment and a third segment, the first segment and the third segment extending from the second segment, thereby forming an elongate channel, the channel configured to engage an edge of a drywall sheet, wherein the third segment has a cross-sectional thickness that tapers from the second segment to an end of the third segment; and a gasket material applied to an exterior surface of one of the segments; and attaching the construction material to the building construction such that the gasket material of the air seal assembly engages at least one of: the top plate, the studs and the bottom plate; and thereby substantially seals gaps formed between the drywall sheet and at least one of the framing members.

16. The method of claim 15, wherein the air seal assembly includes a gasket material configured to compress between the framing members and a drywall sheet.

17. The method of claim 15, wherein the air seal assembly includes a plurality of segments and wherein the segments have a thickness in a range of from about 0.05 inches to about 0.20 inches.

18. The method of claim 17, wherein the third segment has a tapered cross-sectional shape.

\* \* \* \* \*